United States Patent [19]

Mayerhoffer

[11] 4,410,481

[45] Oct. 18, 1983

[54] INSULATING PLATE AND PROCESS FOR THE PREPARATION THEREOF

[75] Inventor: Herbert Mayerhoffer, Vienna, Austria

[73] Assignee: Osterreichische Hiag-Werke Aktiengesellschaft, Vienna, Austria

[21] Appl. No.: 314,935

[22] Filed: Oct. 26, 1981

[30] Foreign Application Priority Data

Oct. 27, 1980 [AT] Austria .................................. 5297/80

[51] Int. Cl.³ ............................................ B29C 23/00
[52] U.S. Cl. ................................. 264/45.3; 264/46.7; 264/257; 264/319; 264/331.12; 264/331.22; 264/DIG. 2
[58] Field of Search ..................... 428/317.9; 264/45.3, 264/46.7, 257, 319, 331.12, 331.22, DIG. 2

[56] References Cited

U.S. PATENT DOCUMENTS 4,284,683  8/1981  Hipchen et al. ................. 428/317.9

FOREIGN PATENT DOCUMENTS 882296  11/1961  United Kingdom .

*Primary Examiner*—Marion McCamish
*Attorney, Agent, or Firm*—Sughrue, Mion, Zinn, Macpeak & Seas

[57] ABSTRACT

A thermal and acoustic insulating plate comprising an aminoplastic resin and a fiber reinforcement embedded therein in the form of a non-woven body of glass fibers extending uniformly throughout the entire volume of the plate. In preparing the plate a non-woven body of glass fibers is impregnated with aminoplastic resin, whereafter the resulting structure is expanded and cured in a mould by supplying heat energy thereto.

10 Claims, No Drawings

INSULATING PLATE AND PROCESS FOR THE PREPARATION THEREOF

BACKGROUND OF THE INVENTION

The invention relates to an insulating plate consisting of expanded aminoplastic resinous material having a reinforcement of mineral fibers embedded therein.

It is known to prepare insulating plates having poor heat conductivity and good sound-absorbing properties on the basis of different expanded and foamed plastics, including aminoplastic resinous materials. Although the known aminoplastic foams have several advantageous properties, such as odorlessness and a favorable behavior against the action of flames, they are relatively brittle and have low mechanical strength. It has been attempted also to improve the mechanical properties of thermoplastic foams by embedding reinforcing fibers, and for that purpose short fibers or chips of fibrous material have been admixed to the mass of synthetic resin to be expanded. However, this complicates the operation for preparing insulating plates and bodies, increases the expenditure of material and the specific weight of the insulating bodies, and normally results in only a moderate improvement of the mechanical properties. Furthermore, in the preparation of insulating plates, flat fibrous structures have been inserted, especially fabrics, into the mass of synthetic resin to be foamed. However, also such a procedure does not provide a satisfactory improvement of the mechanical properties of such insulating bodies and plates, as frequently the bond or linkage of such inserts to the foam of the resinous material is not reliable and the placement of such an insert in the interior of a plate does not improve the mechanical properties in the surface region, whereas the provision of reinforcements at the surface eliminates positive properties of the foam structure.

SUMMARY OF THE INVENTION AND DETAILED DESCRIPTION THEREOF

It is an object of the present invention to provide an insulating plate of the type mentioned above, which has good insulating properties against heat and sound and also good elasticity and workability, and which also possesses a substantially homogenous structure. It is a further object of the invention to provide a simple process for the preparation of such a plate.

The plate of the invention is characterized in that the reinforcement of mineral fibers being a non-woven body of mineral fibers extending in random distribution in all directions throughout the entire volume of the plate, said fiber body having in each portion of said plate substantially the same density, the fibers of said non-woven body lying embedded in the expanded aminoplastic resinous material. Preferably the aminoplastic resinous material is a melamine resin or a melamine-rich aminoplastic resinous material.

By such a construction of the insulating plate the above mentioned object can be achieved in a satisfactory manner, and a plate having a substantially homogenous structure and good elasticity is obtained which can be cut easily to any desired dimensions and which has good resistance against pressure, so that handling and installation do not cause any problems. The homogenity provides equal strength and stability in both directions perpendiculary to each other and following the areal extension of the plate. Furthermore, the plate has good insulating properties against heat and sound and is moisture resistant.

The structure of the fiber reinforcement provided for in the insulating plate of the invention in the form of a non-woven body of mineral fibers extending in random distribution in all directions over the entire volume of the plate provides substantial advantages with respect to the properties of the plate and also with respect to the preparation thereof. By the provision of the non-woven body present in practically all volume regions of the plate in a uniform distribution not only is the mechanical strength at practically each point of the plate against forces acting in any direction increased, but also the possibility is provided to simply obtain insulating plates having a very low density and an equable structure, as with the non-woven body an equable distribution of the expanded aminoplastic resinous material may be achieved.

By the term mineral fibers here glass fibers and fibers made from molten rock material or molten slag are to be understood.

By the term melamine resin here thermosetting resins of melamine and formaldehyde are to be understood.

By the term melamine-rich aminoplastic resins here are to be understood on the one hand aminoplastic resins consisting of at least 60% by weight of melamine resin, the rest being other resins of aminoplastic type or on the other hand resins containing melamine and other aminoplastic forming substances condensed together with formaldehyde, the melamine portion being at least 60% by weight of the total aminoplastic forming substances. Several aminoplastic forming substances are known, e.g. melamine, urea, dicyandiamide etc.

In the preparation of the plate it is especially advantageous that the fiber material can be handled easily due to its presence in the form of said non-woven body, and that it can be impregnated with the aminoplastic synthetic resin with a low expenditure of work. The impregnated non-woven body may be introduced easily into the mould in which the expansion and the curing are effected, and no special provisions are necessary to achieve an equable distribution of the fiber and resinous materials in the mould. If said non-woven body is impregnated a substantially equable distribution of the aminoplastic synthetic resin in the fiber body is obtained and the synthetic resin, as long as it is still liquid, retains this equable distribution due to the fibers extending in the non-woven body in all directions, even if the impregnated body is subjected to several handling operations before introducing it into the mould. The equable distribution of the aminoplastic synthetic resin in the non-woven body allows the preparation of insulating plates having a low density and uniform and good mechanical properties.

It is preferred to select the density of the plates at more than 40 g/l to obtain good mechanical strength. If the density increases the good insulating properties against heat passage will be retained and additionally good strength and workability results. To keep the expenditure of material for the preparation of the plate very low a density of the plate of less than 100 g/l, especially less than 75 g/l, is preferred. The ratio of the weight of synthetic resin to the weight of the non-woven body of mineral fibers in the plate is preferably between 1.5:1 and 0.7:1. If the amount of the mineral fibers is increased the structure of the plate will become denser and the stiffness or hardness and the strength of the plate will increase; on the other hand, if the amount of mineral fibers is decreased, the resin structure will become looser and the elasticity of the plate will increase.

The process of the invention for preparing the insulating plate is characterized by impregnating a loose, non-woven matlike body of material fibers lying in all directions with an aqueous solution of a melamine-formaldehyde-resin or a melamine-rich aminoplastic synthetic resin to which a curing agent has been added and which has been adjusted to hot-curing in excess over the predetermined weight value of resin impregnation, reducing the amount of solution remaining in the non-woven matlike body to said predetermined weight value by removing the excess, placing the impregnated non-woven body in a mould determining the shape of the plate, and expanding and curing the resin solution by supplying energy to heat the solution. Preferably glass fibers are used in this process. It is of advantage to subject the expanded and cured plates after having removed them from the mould to a further heat treatment, especially with hot air. Such a hot air treatment expells water from the plates.

Preferably the fiber material is a loose, non-woven mat-like body consisting of mineral fibers, especially of glass fibers having a density of about 12 to 15 kg/m$^3$, as it is normally used for insulating purposes. As the impregnation provides the fibers with an amount of resin solution being in excess over the predetermined weight value of resin no dosage problems occur in the impregnating operation and by the use of an excess of the resin solution a uniform impregnation of the non-woven body is achieved. To obtain a uniform take-up of the resin by the non-woven body the use of a tenside is advisable. Such a tenside, which may comprise e.g. an alkyl aryl sulfonate is preferably used in an amount of about 2 to 5% by weight, based on the content of solid resin of the solution. It is especially advantageous to use foam-creating tensides. The excess impregnation of the non-woven body is preferably effected by immersion in the resin solution, however, other technologies may also be employed for applying the resin solution onto the non-woven body.

The excess of the resin solution is squeezed off from the impregnated non-woven body, preferably by rolls. Alternatively the excess of resin solution is sucked off. By this removing of the excess of resin solution the ratio between the weight of the synthetic resin to the weight of the non-woven body of mineral fibers in the plate is adjusted to the intended value with consideration of the concentration of the resin in the impregnating solution.

The adjustment of the density of the plate is determined by an adequate selection of the height of the mould in which the impregnated fiber body is caused to expand, in relationship to the area weight of the impregnated matlike body.

For an optimum use of the foaming properties of the resin solution and to obtain foamed bodies having optimum mechanical properties it is preferred to control the expanding and curing step of the resin solution such that first the solvent evaporates with increasing temperature of the resin solution, whereby the resin solution expands. In this stage, however, no curing of the resin should occur and thereby the full expansivity is available. Only after full expansion the curing of the resin should proceed in a short a time as possible.

For this purpose it is preferred to use an aqueous resin solution, the temperature-dependent curing behavior of which is adjusted by selection of the type and amount of the curing agent such that a curing of the resin takes place only above the boiling temperature of the water of the resin solution.

The concentration of the resin in the aqueous solution is important both for the expansion of the resin solution and for the progress of the impregnation. In this connection it is advantageous to adjust the concentration of the aqueous resin solution to a value between 25 and 55% by weight of solid resin, preferably to a value between 30 and 50% by weight. Furthermore, it is especially advantageous for the expansion and curing step if finely divided zinc oxide is added to the aqueous resin solution, the amount of the zinc oxide preferably lying between 3 and 10% by weight based on the contents of solid resin of the solution. The zinc oxide functions as a starting accelerator of these procedures. The zinc oxide may be also a component of an addition to the resin, such as a pigment or a foaming agent.

For the progress of the curing reaction and to obtain a resin structure in the insulating plate as stable as possible, it is also advantageous to use an aqueous solution containing a resin formed from melamine and formaldehyde in a molar ratio of from 1:1.6 to 1:3.

To obtain a good elasticity of the resin structure it is also advantageous to include a plasticizing component in the resin (e.g. sugar or 1-4 butane diol) and/or to provide a plasticizer in the resin solution (e.g. diethylene glycol).

To obtain a structure of the resinous component of the plate as strong as possible but yet elastic, it is favorable to add to the resin solution a film creating substance, e.g. an acrylate dispersion.

The expanding and curing step is effected advantageously in moulds or mould boxes into which a quantity of non-woven matlike body of mineral fibers impregnated with the resin solution is placed. The moulds may be arranged in a heating chamber or heating duct, e.g. in a hot-air chamber, in which a temperature of about 180° to 220° C. is maintained, to heat up the non-woven body of impregnated fibers contained in the moulds. In the course of this heating step the resin solution with which the non-woven body is impregnated expands by the boiling of the solvent and/or by the generation of gas from a foaming agent added to the resin solution, and then cures by adequate adjustment of a curing agent present in the solution. The addition of a foaming agent, e.g. azodicarboxylic acid amide, containing additionally a suitable starter such as zinc oxide to decrease the response temperature, is advantageous in many cases but not absolutely necessary. The response temperature of such foaming agents should be in the range of 100° to 150° C.

To obtain a good expansion of the resin solution without impediment by a curing process already begun and to maintain this expansion up to the completion of the curing process, it is advantageous to use moulds in which the escape of the gas or vapor expanding the resin solution is retarded without any excessive rise of the pressure in the mould.

It is also advantageous to adjust the curing behavior of the resin solution with a suitable curing agent such that the curing process starts and proceeds very quickly after the foaming. It has been found that the use of amine salts of the p-toluene sulfonic acid (e.g. toluene sulfonic acid ethanol amine or toluene sulfonic acid isopropyl amine) is very suitable; preferably amounts of the curing agent of 2 to 5% by weight based on the contents of solid resin in the solution are used.

The expanded material must be kept in the mould until the expanded resin is sufficiently cured, so that it does not substantially change its form without the holding action of the gas or vapor effecting the expansion. The full curing process may be effected in the mould or externally of the mould by a subsequent thermal treatment. Frequently, such a subsequent treatment is advisable to remove any residual moisture still present in the plate after curing. Such a subsequent heat treatment may be effected with hot air at a temperature of about 100° to 150° C. for 5 to 30 minutes.

A preferred embodiment of the process of the invention provides, with respect to the foaming and curing process, that the impregnated non-woven fiber body is subjected to the action of an electric microwave field to supply energy for the expansion of the resin, and is preferably subjected after curing to a subsequent heat treatment with hot air. This offers the advantage that the expansion and curing of the resin may by carried out more rapidly than in heating the material by more conventional means, since the microwave field causes a heat development distributed evenly throughout the entire volume of the material. In this manner the inner zones may be brought more rapidly to a sufficient temperature for foaming and curing than by conventional external heat transfer, which must be conducted through outer layers already expanded and having a poorer heat conductivity to the core of the material. A uniform temperature distribution in the material to be cured thus results through the use of microwave energy for the expansion and curing of the resin, which provides uniform expansion and curing and allows insulating plates of high quality to be prepared in a short period of time. As the expansion of the material and the subsequent curing process may be effected especially quickly with the use of microwave energy, whereas compared therewith the removal of the moisture present in the material requires a longer period, it is especially advantageous to subject the plates expanded and cured by means of microwaves to a subsequent heat treatment with hot air.

SPECIFIC EXAMPLES

Example 1: For preparing an insulating plate of the invention the following resin solution is made up:
 1000 g of a commercially available paper-impregnating melamine resin having a content of solid resin of 55% by weight,
 500 g of water
 50 g of a tenside (Cyclopol)
 50 g of a foaming agent (Genitron EPC)
 25 g of an acrylate dispersion (Plextol BV 410)
 12 g of a curing agent (amine salt of the p-toluene sulfonic acid).

A loose non-woven matlike body of glass fibers having a volumetric weight of about 15 kg/m$^3$ (area weight about 2,3 kg/m$^2$) is completely impregnated with this resin solution. Thereafter the solution is squeezed off between two rolls to such an extent that the impregnated non-woven body has an area weight of 12 kg/m$^2$. Then the impregnated non-woven mat-like body is put into mould boxes having a cavity height of 10 cm. By the action of microwaves the impregnated fiber material expands and subsequently cures. A microwave power of about 15 kWh/m$^2$ of bottom area is supplied to the mould for 5 minutes. During that period the material is caused to expand and to begin to cure. Subsequently the material is kept in the mould for an additional 2 minutes without any further supply of energy, which causes a complete curing of the melamine resin. The plate thus formed is then removed from the mould and subjected to a subsequent heat treatment with hot air in which the plate is heated to a temperature of 100° to 120° C., until it is thoroughly dried (about 12 minutes). The finished insulating plate has a density of about 65 kg/m$^3$.

Example 2: For preparing an insulating plate of the invention the following resin preparation is made up:
 1000 g of a melamine-formaldehyde-condensate having a molar ratio of 1:2.3 and a content of solid resin of 60%,
 600 g of water
 60 g of tenside
 60 g of diethylene glycol
 50 g of zinc oxide
 20 g of a curing agent (combination of an amine salt of the p-toluene sulfonic acid and an amine-hydrochloride).

A loose non-woven matlike body of glass fibers having a volumetric weight of about 12 kg/m$^3$ (area weight about 2 kg/m$^2$) is completely impregnated with the above resin solution, whereafter the solution is squeezed off between two rolls to such an extent that the impregnated non-woven body has an area weight of 8 kg/m$^2$. The impregnated non-woven body is then put into mould boxes having a height of 8 cm. These moulds are subjected to a treatment with hot air at 200° C. for 35 minutes, by which treatment the impregnated fiber material expands and subsequently cures. The plates thus formed are removed from the mould. A subsequent drying step is not necessary. The finished insulating plate has a volumetric weight of 50 kg/m$^3$.

Example 3: For preparing an insulating plate of the invention a melamine-rich aminoplastic resin in the form of a melamine resin is used in which 10 mol-% of the melamine portion is replaced by urea. This melamine resin has a content of solid resin of 60% and contains 8% of plasticizers (sugar or 1-4 butane diol) based on the liquid resin. This resin is used for preparing the following resin solution to be used for the impregnation of a non-woven matlike body of glass fibers having a volumetric weight of about 12 kg/m$^3$ (area weight about 1,8 kg/m$^2$):
 1000 g of resin
 500 g of water
 50 g of tenside
 20 g of acrylate dispersion
 35 g of zinc oxide
 15 g of curing agent (amine salt of the p-toluene sulfonic acid).

The impregnated non-woven body of glass fibers is squeezed off to give an area weight of about 5.5 kg/m$^2$, put into a mould having a height of 5 cm, and expanded and cured by the action of electric microwave energy. A microwave power of 15 kWh/m$^2$ is applied for 3.5 minutes; then an after-curing is allowed to take place in the mould for 2 minutes without any supply of energy. Subsequently the insulating plate thus prepared is removed from the mould and dried at a temperature of 120° to 140° C. (about 9 minutes) with hot air. The finished insulating plate has a volumetric weight of about 62 kg/m$^3$.

What is claimed is:
1. A process for the preparation of an insulating plate comprising impregnating a loose, non-woven matlike body of mineral fibers lying in all directions with an aqueous solution of a melamine-formaldehyde-resin or a melamine-rich aminoplastic synthetic resin to which a curing agent has been added and which has been adjusted to hot-curing in excess over the predetermined weight value of resin impregnation, reducing the amount of solution remaining in the non-woven matlike body to said predetermined weight value by removing the excess, placing the impregnated non-woven body in a mould determining the shape of the plate, and subjecting said non-woven body to the action of an electric microwave field to supply energy for the expansion and curing of the resin and thereafter said non-woven body is taken out from the mould and subjected to a subsequent heat treatment with hot air.

2. The process of claim 1, in which the mineral fibers are glass fibers.

3. The process of claims 1 or 2, in which finely divided zinc oxide is added to the aqueous resin solution in an amount up to 10% by weight based on the contents of solid resin of the solution.

4. The process of claims 1 or 2, in which finely divided zinc oxide is added to the aqueous resin solution in an amount between 3 and 10% by weight based on the contents of solid resin of the solution.

5. The process of claims 1 or 2, in which the temperature-dependent curing behavior of the resin solution is adjusted by selecting the type and amount of the curing agent so that the resin cures only above the boiling temperature of the water of the resin solution.

6. The process of claims 1 or 2, in which the concentration of the aqueous resin solution is adjusted to a value between 25% and 55% by weight of solid resin.

7. The process of claim 6 wherein said value is between 30 and 50% by weight.

8. The process of claims 1 or 2, in which the aqueous resin solution contains a resin formed by melamine and formaldehyde in a molar ratio of between 1.6 and 3.0.

9. The process of claims 1 or 2, in which the resin solution contains a film creating substance, e.g. an acrylate dispersion.

10. The process of claim 1, in which the excess impregnation of the loose non-woven matlike body is achieved by immersion into the resin solution.

* * * * *